T. LUMSDEN.
TOOL HOLDER FOR TOOL GRINDING MACHINES.
APPLICATION FILED OCT. 18, 1912.

1,072,629.

Patented Sept. 9, 1913.

3 SHEETS—SHEET 1.

WITNESSES:
John C. Sanders
A. T. Heuman

INVENTOR
Thomas Lumsden
BY
ATT'Y.

T. LUMSDEN.
TOOL HOLDER FOR TOOL GRINDING MACHINES.
APPLICATION FILED OCT. 18, 1912.

1,072,629.

Patented Sept. 9, 1913.

3 SHEETS—SHEET 2.

WITNESSES:
John C. Sanders
A. F. Heuman

INVENTOR:
Thomas Lumsden
BY
ATTY

T. LUMSDEN.
TOOL HOLDER FOR TOOL GRINDING MACHINES.
APPLICATION FILED OCT. 18, 1912.

1,072,629.

Patented Sept. 9, 1913.

3 SHEETS—SHEET 3.

WITNESSES:
John C. Sanders
A. F. Heuman

INVENTOR
Thomas Lumsden
BY
ATTY

UNITED STATES PATENT OFFICE.

THOMAS LUMSDEN, OF GATESHEAD, ENGLAND.

TOOL-HOLDER FOR TOOL-GRINDING MACHINES.

1,072,629.  Specification of Letters Patent.  Patented Sept. 9, 1913.

Application filed October 18, 1912. Serial No. 726,497.

*To all whom it may concern:*

Be it known that I, THOMAS LUMSDEN, a subject of the King of Great Britain and Ireland, residing at Gateshead, in the county of Durham, England, have invented new and useful Improvements in Tool-Holders for Tool-Grinding Machines, of which the following is a specification.

This invention relates to tool holders for grinding machines especially machines for grinding the tools of lathes, planing, slotting, shaping and like machines, and the invention has for its object to provide improved means for facilitating the accurate grinding of the rounded nose of a tool which projects to one side or is "off-set" from the center line of the shank of the tool and also to provide an improved arrangement of chuck for clamping the tool in the holder.

According to one part of the invention I so arrange the holder or so mount and clamp the tool therein that the tool, after being clamped, can be rectilinearly moved or adjusted transversely or at right angles to its longitudinal center line to carry the geometrical center of an "off-set" nose into alinement with a center about which the holder can be moved to grind a rounded nose.

According to a further part of the invention, instead of arranging the dogs of the chuck for clamping the tool equidistantly or at angles of 120° to each other as is usual, I arrange two of the dogs at a considerably lesser angle to each other than to the third dog.

Figure 1:
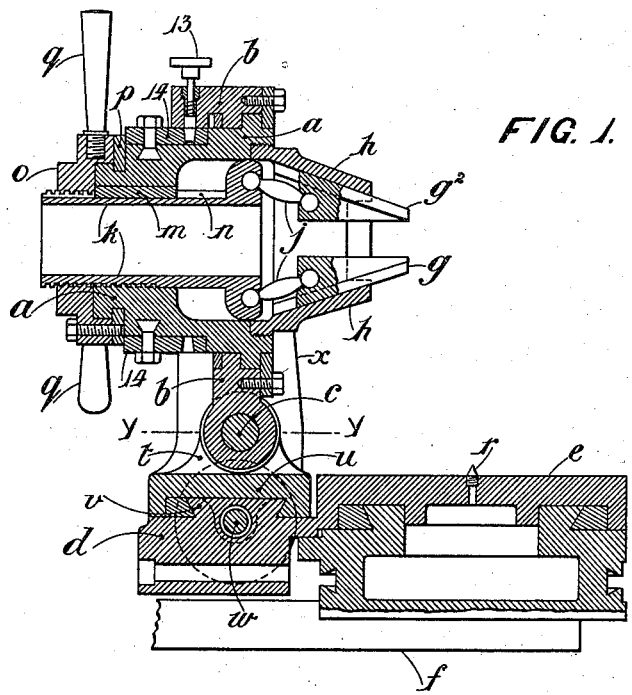
Figure 2:
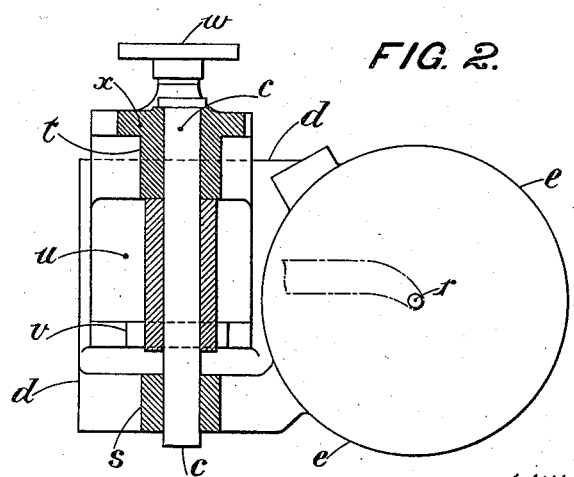
Figure 3:
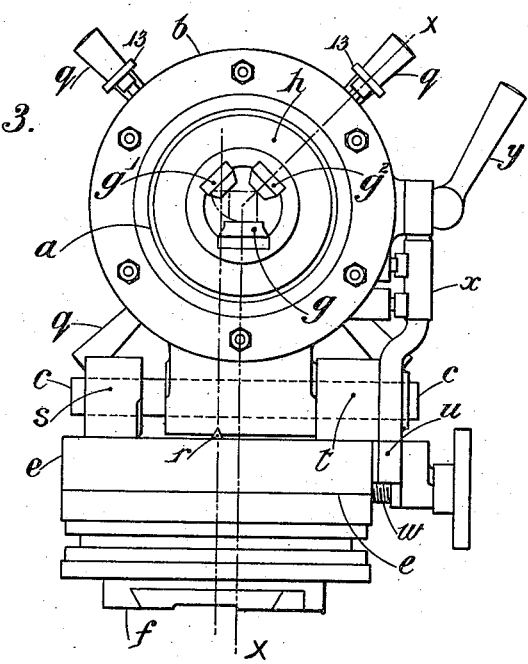
Figure 4:
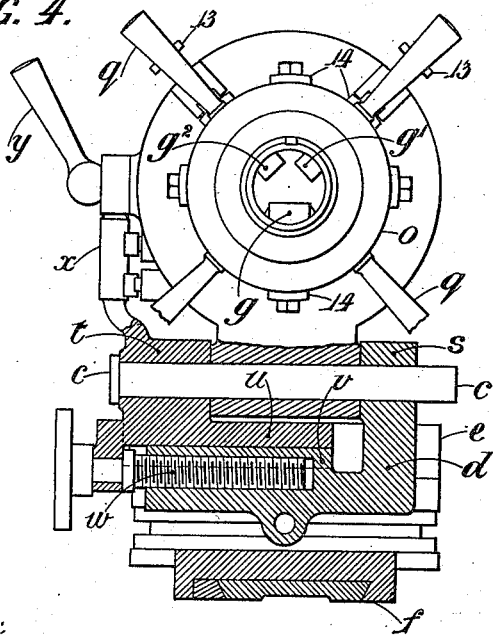
Figure 5:
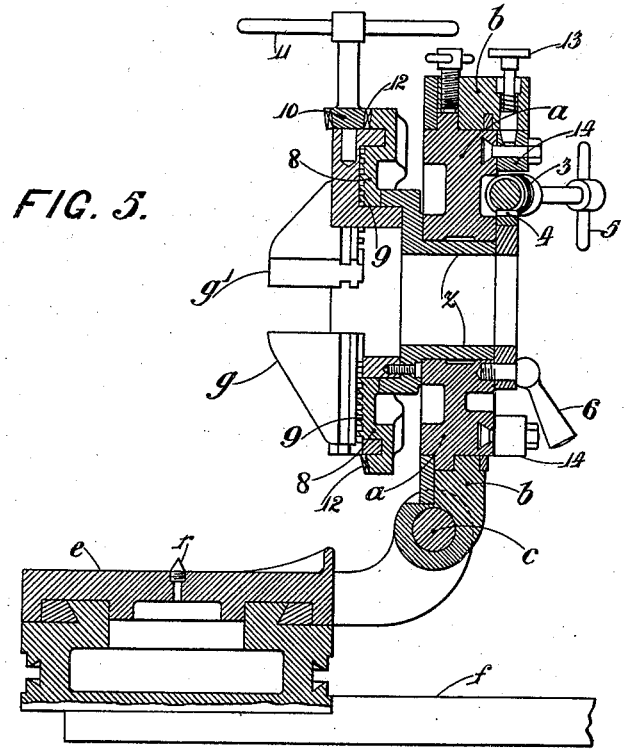
Figure 6:
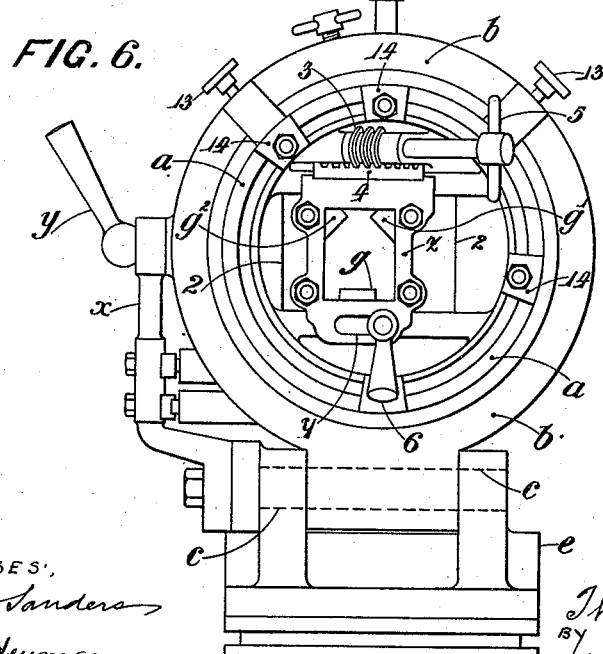

In the accompanying drawings Figure 1 is a longitudinal section (on the line X—X in Fig. 3) illustrating one embodiment of the invention. Fig. 2 is a sectional plan on the line Y—Y in Fig. 1; Fig. 3 is an elevation looking on the right-hand side of Fig. 1; and Fig. 4 is an elevation, partly in section, looking on the left hand side of Fig. 1. Fig. 5 is a longitudinal section illustrating another embodiment of the invention, and Fig. 6 is an elevation looking on the right-hand side of Fig. 5.

Referring to Figs. 1 to 4, $a$ is a block mounted in an annular carrier or frame $b$ and angularly adjustable therein. The carrier or frame $b$ is pivoted at $c$ to an extension $d$ on a turn-table $e$ carried by a compound slide part of which is shown at $f$. The tool to be ground, which is indicated in dot-and-dash lines in Figs. 2 and 3, is clamped in the block $a$ by a chuck comprising three wedge-shaped or tapered dogs $g$, $g^1$ and $g^2$ which are mounted and slide in dovetailed grooves in a conical box $h$ attached to the block $a$. The dogs $g$, $g^1$ and $g^2$ are connected by toggles, pivoted links or the like $j$ to a sleeve $k$ splined in the block $a$ by a key $m$ on the block engaging a groove or key-way $n$ in the sleeve. With a screw thread on the sleeve $k$ co-acts a nut $o$ mounted on the block $a$ and retained thereon by a locking ring $p$ made in halves and fitting into a groove in the block. On rotating the nut $o$ by handles $q$ the sleeve $k$ is traveled axially and causes the dogs $g$, $g^1$ and $g^2$ through their engagement with the conical box $h$ to recede from or approach each other according to the direction of rotation of the nut.

Instead of arranging the dogs $g$, $g^1$ and $g^2$ equidistantly or at angles of 120° to each other as is usual in such chucks, and in order that the chuck may have a wider range than usual for clamping tools of various sizes and sections, I arrange two of the dogs at a considerably lesser angle to each other than to the third dog. Preferably the dogs $g^1$ and $g^2$ are arranged at an angle of 90° to each other so that each is at an angle of 135° to the dog $g$.

In order, when grinding a tool having an "off-set" rounded nose, that the geometrical center of the nose may be alined with the center $r$ of the turn-table $e$ about which the tool-holder and the tool are moved to grind rounded surfaces, one lug $s$ in which the pivot $c$ is mounted is provided on the extension $d$ of the turn-table and the other lug $t$ is provided on a slide $u$ which is adjustable on a guide $v$ on the extension $d$ by means of an adjusting screw $w$. The slide $u$ also carries a bracket $x$ to which the carrier or frame $b$ is clamped by a clamping nut $y$ in the desired angular position on its pivot $c$ as usual. By operating the adjusting screw $w$ the carrier or frame $b$ and its attached parts can be moved as shown in Figs. 2 and 3, transversely or at right angles to its axis and the longitudinal center line of the tool to bring the geometrical center of the nose of the tool into co-incidence or alinement with the center $r$ of the turn-table $e$ so that by moving or oscillating the turn-table the tool is moved or oscillated about the geometrical center of its nose and the latter can be accurately ground.

It is obvious that, instead of adjusting or moving the annular carrier or frame $b$ transversely or at right angles to its axis, I may arrange the tool to be adjustable in or on the block *a* transversely or at right angles to the axis thereof. Such an arrangement is shown in Figs. 5 and 6 wherein *z* is a tool-support mounted in a transverse slot 2 in the block *a* and adapted to be adjusted or moved therein by a worm 3 mounted on the rear face of the block *a* and co-acting with a corresponding rack 4 on the support *z*. The worm 3 is operated by a handle 5, and the support *z* is clamped in the required position by a clamping screw 6 passing through a slot 7 in the support. The dogs *g*, *g*¹ and *g*² for clamping the tool in the support *z* are operated by an annular disk 8 mounted on the support and provided with a spiral or scroll-like screw thread 9 which co-acts with corresponding part threads on the dogs. The disk 8 is operated by a bevel pinion 10 provided with a handle 11 and engaging teeth 12 formed on the disk.

13 are the usual spring plungers which engage adjustable stops 14 on the block *a* for holding the latter at any desired angular adjustment in the annular carrier or frame *b*, and the usual stops for holding the turntable *e* at any desired angular position will of course be provided.

It will now be seen that, once the tool has been clamped in the holder, it need not be re-adjusted therein or removed until the whole of the several faces or surfaces have been ground as required as every face or surface can be brought into position for grinding by the various adjustments of the holder.

What I claim and desire to secure by Letters Patent is:—

1. In tool holders for tool grinding machines the combination of a turn-table, an annular carrier or frame pivoted on said turn-table and angularly adjustable about its pivot, a block mounted in said annular carrier or frame and angularly adjustable therein, means for clamping the tool to be ground in said block, and means for rectilinearly adjusting said tool relatively to the center of said turn-table and transversely or at right angles to the length of the tool after it has been clamped.

2. In tool holders for tool grinding machines the combination of a turn-table, an annular carrier or frame pivoted on said turn-table in the horizontal plane and angularly adjustable in the vertical plane, a block mounted in said annular carrier or frame and angularly adjustable therein, means for clamping the tool to be ground in said block, and means for rectilinearly adjusting said annular carrier or frame relatively to the center of said turn-table and parallel to the axis of its pivot.

3. In tool holders for tool grinding machines the combination of a turn-table, a lug on said turn-table, a slide rectilinearly adjustable on said turn-table, a lug on said slide, a pivot mounted in said lugs, an annular carrier or frame mounted on said pivot, an adjusting screw for adjusting said slide parallel to the axis of said pivot, a block mounted in said annular carrier or frame and angularly adjustable therein, and means for clamping the tool to be ground in said block.

4. In tool holders for tool grinding machines the combination of a turn-table, an annular carrier or frame pivoted on said turn-table and angularly adjustable about its pivot, a block mounted in said annular carrier or frame and angularly adjustable therein, means for rectilinearly adjusting said annular carrier or frame relatively to the center of said turn-table and transversely or at right angles to its axis, and a chuck for clamping the tool to be ground in said block, said chuck comprising three dogs two of which are arranged at a considerably lesser angle to each other than to the third dog.

5. In tool holders for tool grinding machines the combination of a turn-table, an annular carrier or frame pivoted on said turn-table and angularly adjustable about its pivot, a block mounted in said annular carrier or frame and angularly adjustable therein, a tool-support on said block, means for clamping the tool to be ground in said support, and means for rectilinearly adjusting said tool support relatively to the center of said turn-table and transversely or at right angles to said block.

6. In tool holders for tool grinding machines the combination of a turn-table, an annular carrier pivoted on said turn-table and angularly adjustable about its pivot, a block mounted in said annular carrier or frame and angularly adjustable therein, a transverse slot in said block, a tool-support mounted in said slot and rectilinearly adjustable therein relatively to the center of said turn-table and transversely or at right angles to the axis of said block, and a chuck for clamping the tool to be ground in said tool-support, said chuck comprising three dogs two of which are arranged at a considerably lesser angle to each other than to the third.

In testimony whereof I have signed my name to this specification in the presence of two subscribing witnesses.

THOMAS LUMSDEN.

Witnesses:
EDMUND WARD PATTISON,
HERBERT HOWARD.